United States Patent
Corrigan et al.

(10) Patent No.: US 10,643,290 B2
(45) Date of Patent: May 5, 2020

(54) IDENTIFICATION TAGS FOR TRACKING MANUFACTURING OF AIRCRAFT PARTS

(71) Applicant: Bell Helicopter Textron Inc., Fort Worth, TX (US)

(72) Inventors: James Corrigan, Kingston (CA); Pier-Alexandre Pelletier, Saint-Colomban (CA)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 495 days.

(21) Appl. No.: 14/921,064

(22) Filed: Oct. 23, 2015

(65) Prior Publication Data

US 2017/0116684 A1 Apr. 27, 2017

(51) Int. Cl.
G06Q 10/08 (2012.01)
G06Q 50/04 (2012.01)
G06Q 10/00 (2012.01)

(52) U.S. Cl.
CPC .......... *G06Q 50/04* (2013.01); *G06Q 10/00* (2013.01); *G06Q 10/087* (2013.01)

(58) Field of Classification Search
CPC ............... G06Q 50/04; G06Q 10/087; Y10T 29/49316; Y10T 29/4932; Y10T 29/49332; Y10T 29/49336; Y10T 29/49337
See application file for complete search history.

(56) References Cited

U.S. PATENT DOCUMENTS

| | | | | |
|---|---|---|---|---|
| 6,582,197 B2* | 6/2003 | Coulson | ................... | B22C 7/02 164/122.1 |
| 7,076,532 B2* | 7/2006 | Craik | .................... | G06Q 10/10 709/217 |
| 7,715,943 B2* | 5/2010 | Loda | ...................... | G06Q 10/06 340/425.5 |
| 8,111,161 B2* | 2/2012 | Lee | ........................ | F01D 17/02 340/10.1 |
| 8,123,463 B2* | 2/2012 | Kray | .................... | F04D 29/023 156/175 |
| 2006/0018361 A1* | 1/2006 | Hardwicke | ............. | G01K 7/01 374/141 |

* cited by examiner

*Primary Examiner* — Rick K Chang
(74) *Attorney, Agent, or Firm* — Patent Capital Group

(57) ABSTRACT

According to one embodiment, an aircraft component is manufactured from a plurality of separate materials comprising a first material. The first material is physically associated with a tracking device comprising a first storage medium featuring line-of-sight accessible information and a second storage medium featuring non-line-of-sight accessible information. The line-of-sight accessible information and the non-line-of-sight accessible information each comprise information regarding the first material physically associated with the tracking device.

19 Claims, 3 Drawing Sheets

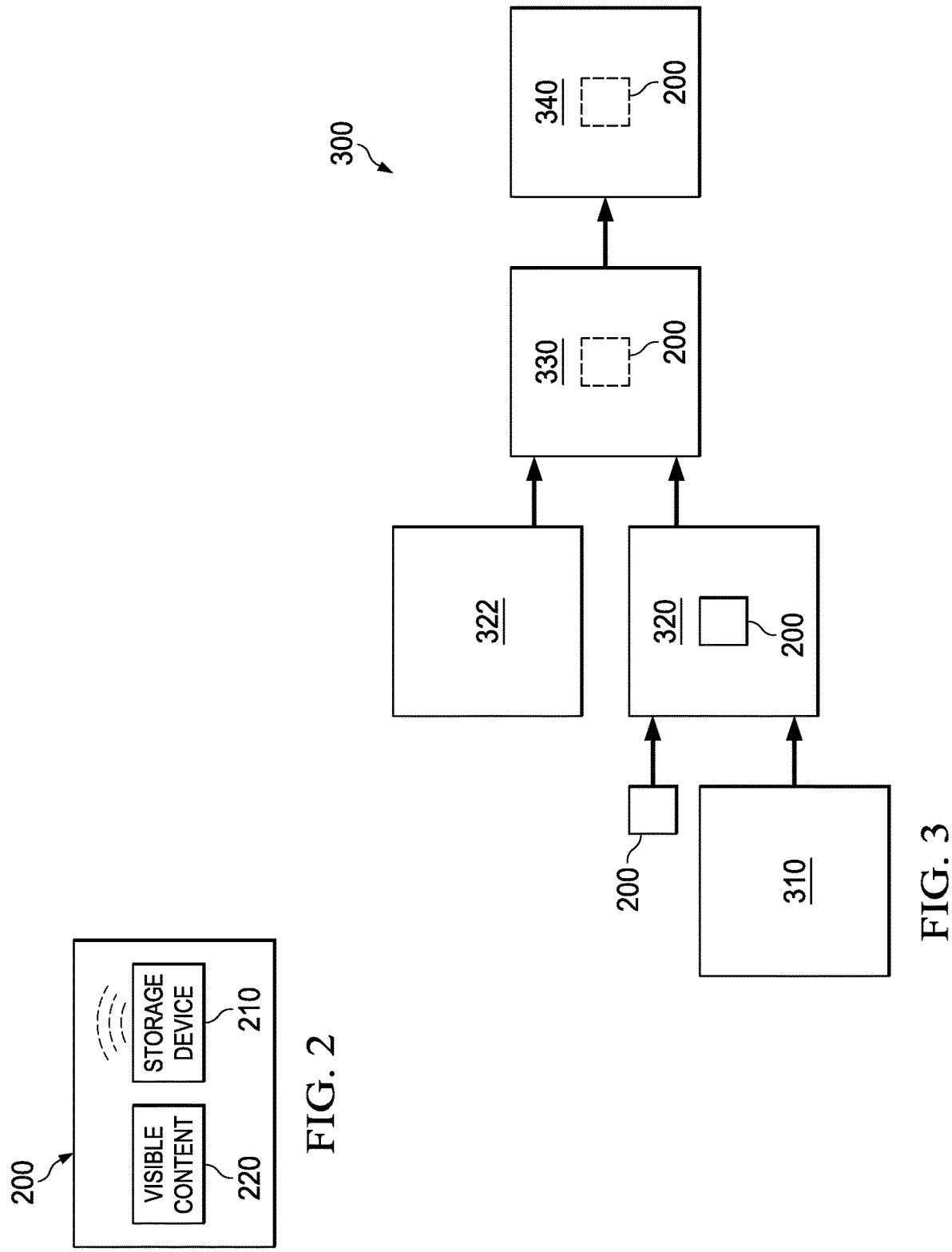

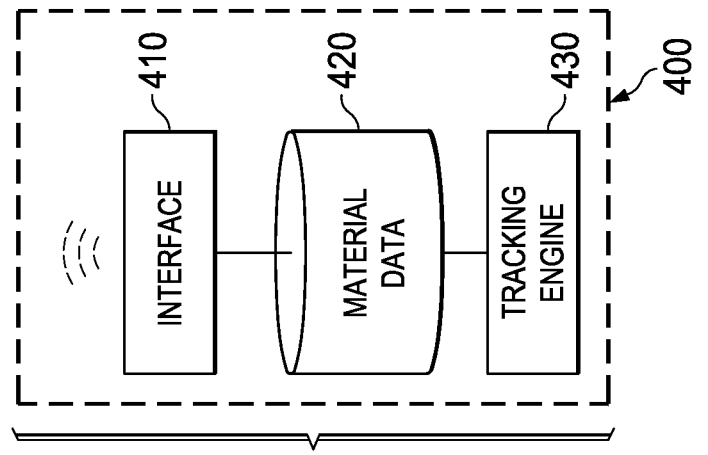
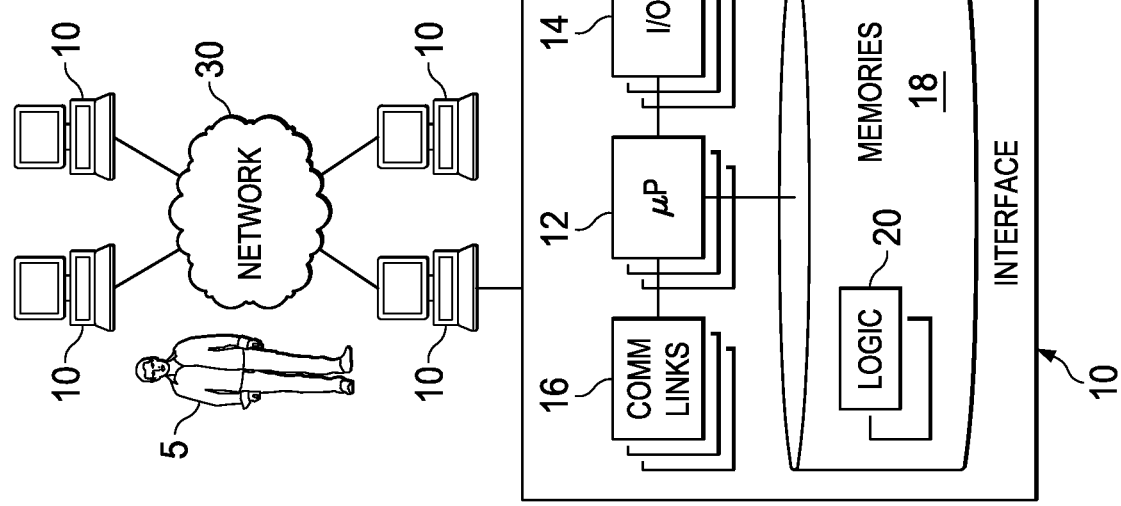
FIG. 4

IDENTIFICATION TAGS FOR TRACKING MANUFACTURING OF AIRCRAFT PARTS

TECHNICAL FIELD

This invention relates generally to aircraft parts, and more particularly, to aircraft part identification tags for tracking manufacturing of aircraft parts.

BACKGROUND

An aircraft, such as a rotorcraft, may be manufactured from a variety of parts. The manufacturing process may include a variety of steps, from receiving raw material through producing final product. Raw material may be subject to a variety of conditions during the manufacturing process.

SUMMARY

Particular embodiments of the present disclosure may provide one or more technical advantages. A technical advantage of one embodiment may include the capability to apply a line-of-sight (e.g., human readable) and non-line-of-sight (e.g., machine-readable, such as via RFID) labels to materials, such as metallic or composite panels, during any stage of their manufacture such that the location of the parts may be directly tracked during the subsequent steps of the manufacturing process. A technical advantage of one embodiment may also include the capability to store pertinent information within the RFID memory of the label regarding the condition of the material during the manufacturing process.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2 shows a tracking device according to one embodiment that may be used during the manufacture of at least one component of an aircraft such as the rotorcraft of FIG. 1;

FIG. 3 shows an example manufacturing process according to one example embodiment that may utilize the tracking device of FIG. 2 to manufacture at least one component of an aircraft such as the rotorcraft of FIG. 1; and FIG. 4 shows a tracking system according to one example embodiment that may interact with machine-readable elements of the tracking device of FIG. 2.

DETAILED DESCRIPTION OF THE DRAWINGS

Figure 1:
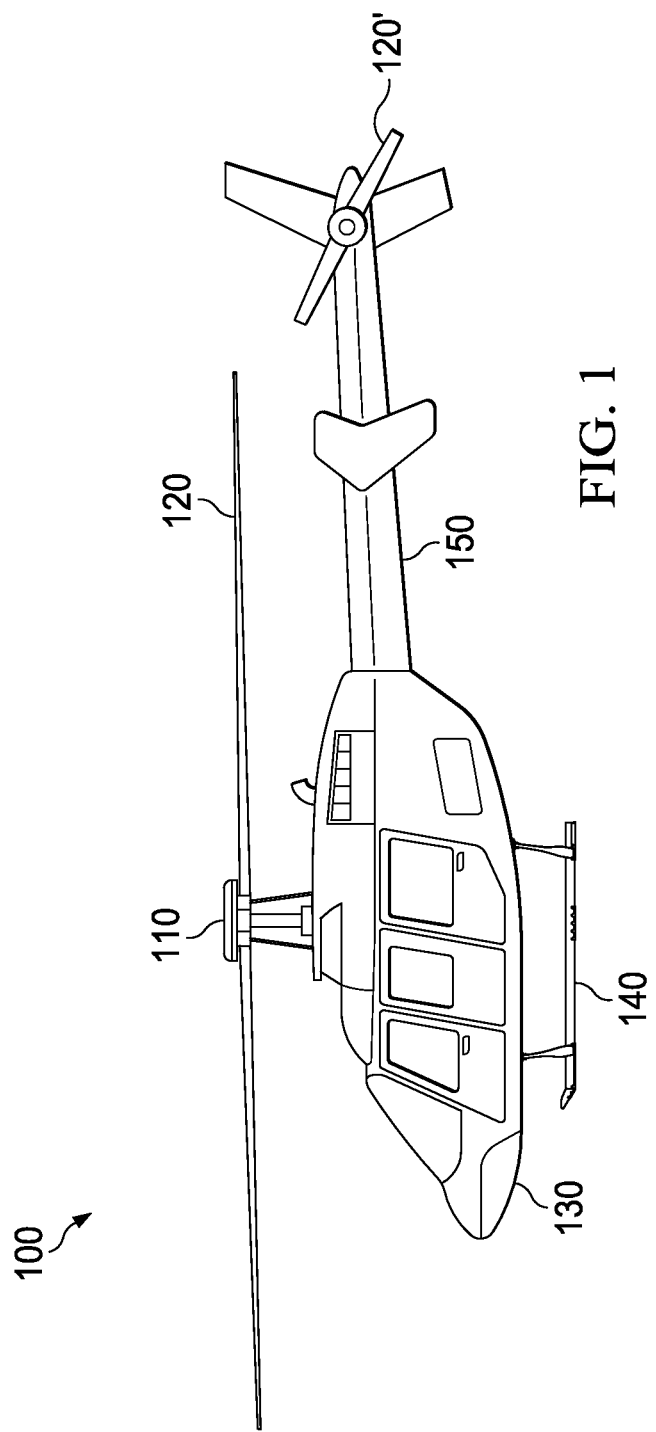
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

An aircraft, such as a rotorcraft, may be manufactured from a variety of parts. The manufacturing process may include a variety of steps, from receiving raw material through producing final product. Raw material may be subject to a variety of conditions during the manufacturing process.

One example of a manufacturing process that will be referred to throughout this document is the manufacture of composite materials. At a high level, composites are manufactured by fabricating raw materials (e.g., matrices, reinforcements, and/or core) into a composite material. The fabrication process may include a variety of heating and/or moulding techniques, such as vacuum-bag moulding, pressure-bag moulding, autoclave moulding, resin-transfer moulding, press moulding, transfer moulding, pultrusion moulding, filament winding, casting, centrifugal casting, continuous casting, and slip forming, just to name a few. The fabrication process may also include other steps before, after, or in place of heating and/or moulding techniques, including but not limited to material lay-up and finishing work (e.g., cutting, trimming, surface conditioning, etc.).

Teachings of certain embodiments recognize the capability to track materials through the manufacturing process. In particular, teachings of certain embodiments recognize the capability to track raw materials before, during, and after the heating, moulding, or other steps of the fabrication process in which raw materials are exposed to an extreme environment.

Materials may be tracked for a variety of reasons. For example, prior to fabrication, materials may be tracked for inventory control purposes, such as to identify where raw materials are located, how many are on-hand, and whether they are available for fabrication. During fabrication, materials may be tracked to monitor the manufacturing process. After fabrication, the final product may be tracked for inventory control purposes, such as tracking the location of and other information about the finished product.

Teachings of certain embodiments recognize the capability to provide a single tracking device that enables the tracking of information in multiple formats. For example, the single tracking device may include content visible via line-of-sight that enables a worker to see the material and information about the material (e.g., material type, material number, receipt date, source, barcodes, and human-readable information that may be printed for display). In addition, the single tracking device may include a storage medium that includes a transmission device for transmitting information from the single tracking device to another source, such as a computer system.

FIG. 2 shows a tracking device 200 according to one embodiment. Tracking device 200 may represent a tracking device that may be associated with a raw material, a component, a subcomponent, a finished product, or any other item that represents an aircraft part or an element of an aircraft part. Such an aircraft part may be associated with an aircraft such as rotorcraft 100 of FIG. 1.

In the example of FIG. 2, tracking device 200 comprises a storage device 210 and visible content 220. In one example embodiment, tracking device 200 may represent a printed label (representing visible content 220) and an incorporated radio-frequency identification (RFID) tag. In general, storage device 210 and visible content 220 may be considered incorporated if they form a single unit. In the previous example, the RFID tag may be incorporated in the printed label if, for example, the RFID tag is attached to, embedded into, or otherwise physically associated with the printed label.

Although example embodiments refer to a "printed" label, teachings of certain embodiments recognize that printing may include a variety of different identification processes, such as printing, stamping, etching, and laser marking.

Storage device 210 may be operable to store and transmit identification information and/or other information regarding the material to which tracking device 200 is associated. Examples of storage device 210 may include, but are not limited to, passive and active radio-frequency identification (RFID) tags. RFID is the use of a wireless non-contact system that uses radio-frequency electromagnetic fields to transfer data from a tag attached to or near an object. Passive RFID tags may not require a battery, but rather may be powered by the electromagnetic fields used to read them. Active RFID tags, on the other hand, may use a local power source and emit radio waves (electromagnetic radiation at radio frequencies). An RFID tag may contain electronically stored information which can be read at a distance. Unlike a bar code, the RFID tag does not necessarily need to be within line of sight of the reader and may even be embedded in the tracked object.

Examples of storage device 210 may not be limited to RFID tags. Another potential example of storage device 210 may include a contact memory button (CMB) or flash memory device. CMBs are electronic devices that can receive, store, and/or transmit information when contacted with a touch probe. CMBs may have a larger storage/transmission capacity than RFID tags but may also have a shorter transmission range.

In some embodiments, the information stored and transmitted by storage device 210 may represent information identifying the material to which tracking device 200 is associated. For example, the information identifying the material may include an identification number unique to the material or to the type of material. In some embodiments, storage device 210 may include sufficient information to allow an inventory management system to identify the material and its location within a storage facility.

Visible content 220 may be operable to store and display identification information and/or other information regarding the material to which tracking device 200 is associated. Visible content 220 may include the same information as storage device 210 or different information than storage device 210.

In addition to the examples mentioned above, storage device 210 and visible content 220 may store a myriad of information. For example, they may store information describing a history of the material associated with tracking device 200 (e.g., maintenance history, environmental history, service history, repair history) as well as manuals indicating how the material should be handled. As another example, they may store environmental history of tracking device 200 and/or the material associated with tracking device 200. This environmental history may describe what the material has been subject to, for example, during the manufacturing process.

As stated above, teachings of certain embodiments recognize the capability to track materials through the manufacturing process. In the example of FIG. 2, teachings of certain embodiments recognize the capability for storage device 210 to survive the manufacturing process such that it remains functional before and after part fabrication. As such, embodiments of storage device 210 may be capable of surviving heating, moulding, or other steps of the fabrication process in which materials are exposed to an extreme environment.

FIG. 3 shows an example manufacturing process 300 according to one example embodiment. In the example of FIG. 3, tracking device 200 and material 310 are provided. Material 310 may represent any raw material, component, subcomponent, finished product, or any other item that represents an aircraft part or an element of an aircraft part. Such an aircraft part may be associated with an aircraft such as rotorcraft 100 of FIG. 1.

Next, tracking device 200 is applied to material 310 to yield a tracked material 320. In one example embodiment, tracking device 200 may represent a printed label with an integrated RFID tag, and tracking device 200 is applied to material 310 using an adhesive or other substance. Teachings of certain embodiments recognize that applying tracking device 200 to its associated material 310 directly (as compared to tracking paperwork associated with material 310) may allow for more accurate location tracking using wireless communication techniques such as RFID communications.

Next, other materials 322 are combined with tracked material 320 to yield a combined material 330. Other materials 322 may represent any variety of materials, including materials that have their own associated tracking devices. As seen in the example of FIG. 3, combined material 330 includes the tracking device 200 that was applied to material 310.

Next, combined material 330 is subjected to one or more manufacturing processes to yield finished product 340. Examples of these manufacturing processes may include any variety of fabrication techniques, as well as pre- and post-fabrication techniques.

Returning to a previous example, materials 310 and 322 may, in one example scenario, represent plies to be used in a composite layup. Thus, in this example scenario, tracking device 200 is applied to material 310 and is carried through the manufacturing process by material 310. In this example scenario, combined material 330 may represent a layup of multiple plies including material 310. Next, this combined material 330 may be subjected to one or more composite manufacturing processes, such as heating or moulding, to yield finished product 340. In this example, teachings of certain embodiments recognize that tracking device 200 may withstand these composite manufacturing processes such that the storage device 210 of tracking device 200 remains operational throughout the process.

As explained above, device 200 may include machine-readable elements such as an RFID tag. FIG. 4 shows a tracking system 400 according to one example embodiment that may interact with machine-readable elements of device 200 such as an RFID tag. In general, system 400 features an interface 410, a material repository 420, and a tracking engine 430, which may be implemented across one or more computers 10 and may be accessed by one or more users 5.

Users 5 may access system 400 through computer systems 10. For example, in some embodiments, users 5 may access material repository 420 and tracking engine 430 through computer systems 10. Users 5 may include any individual, group of individuals, entity, machine, and/or mechanism that interacts with computer systems 10. Examples of users include, but are not limited to, a worker, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Interface 410 may represent any device for collecting information directly from tracking device 200. In one example embodiment, interface 410 is an RFID tag scanner capable of collecting information from an RFID tag associated with storage device 210. In another example, interface 410 is a barcode reader capable of collecting information from a barcode associated with visible content 220. Thus, teachings of certain embodiments recognize that interface 410 may represent devices capable of collecting information via line-of-sight as well as via non-line-of-sight techniques.

Material repository 420 may store information collected from tracking device 200 as well as other information. Examples of information collected from tracking device 200 may include information about the material associated with tracking device 200 (e.g., material type, material number, receipt date, source, barcodes, and human-readable information that may be printed for display) as well as information about tracking device 200 that may be used to determine additional information about the material associated with tracking device 200 (e.g., location information of tracking device 200 that may be used to determine the location of the material associated with tracking device 200). Examples of other information stored by material repository 420 may include more detailed material information that exceeds the storage capacity of tracking device 200 as well as information associated with other materials (e.g., inventory information about materials other than the material associated with tracking device 200).

Tracking engine 430 may determine and report various information based on the data stored by material repository 420. In one example embodiment, tracking engine 430 may determine the location of tracking device 200 from data stored in material repository 420 and then report this determined location to user 5. In another example embodiment, tracking engine 430 may be integrated into an inventory management system that uses information from material repository 420 to provide real-time information regarding how many materials are in stock.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method of manufacturing aircraft parts, the method comprising:
    receiving a plurality of separate materials comprising a first material, the first material being physically associated with a tracking device comprising a first storage medium featuring line-of-sight accessible information and a contact memory button featuring non-line-of-sight accessible information, the line-of-sight accessible information and the non-line-of-sight accessible information each comprising information regarding the first material physically associated with the tracking device;
    communicating a first portion of the non-line-of-sight accessible information from the contact memory button to a tracking system;
    subjecting the plurality of separate materials, including the first material and the tracking device, to one or more manufacturing steps, wherein the one or more manufacturing steps form the plurality of separate materials and the tracking device into a single, composite structure; and
    communicating, after subjecting the plurality of separate materials to the one or more manufacturing steps, a second portion of the non-line-of-sight accessible information from the contact memory button to the tracking system, wherein the second portion of the non-line-of-sight accessible information comprises environmental history data describing environment conditions to which the plurality of separate materials and the tracking device were exposed during the one or more manufacturing steps and service data comprising a manual associated with the first material;
    wherein receiving the plurality of separate materials comprising the first material comprises receiving the plurality of separate materials comprising the first material without the tracking device being physically associated with the first material, and physically associating the tracking device with the first material; and
    wherein the tracking device comprises a printed part label, wherein the contact memory button is physically integrated into the printed part label and physically associating the printed part label with the first material comprises gluing the tracking device to the first material.

2. The method of claim 1, wherein the first storage medium comprises a barcode.

3. The method of claim 1, wherein the first storage medium and the contact memory button are physically incorporated into a single device.

4. The method of claim 1, wherein the one or more manufacturing steps comprises heating or moulding the plurality of separate materials at a sufficient temperature to form the plurality of separate materials into a single, composite structure.

5. The method of claim 1, wherein the first portion and the second portion contain the same information.

6. The method of claim 1, further comprising providing, from the tracking system, at least one status update to a user based on the first portion and the second portion.

7. The method of claim 6, wherein the status update comprises an update in a location of the tracking device based on movement of the tracking device between when the first portion was communicated and when the second portion was communicated.

8. A method of manufacturing aircraft parts, the method comprising:
    receiving a plurality of separate materials comprising a first material, the first material being physically associated with a tracking device comprising a first storage medium featuring line-of-sight accessible information and a contact memory button featuring non-line-of-sight accessible information, the line-of-sight accessible information and the non-line-of-sight accessible information each comprising information regarding the first material physically associated with the tracking device;
    communicating a first portion of the non-line-of-sight accessible information from the contact memory button to a tracking system;
    subjecting the plurality of separate materials, including the first material and the tracking device, to one or more manufacturing steps, wherein the one or more manufacturing steps form the plurality of separate materials and the tracking device into a single, composite structure; and
    communicating, after subjecting the plurality of separate materials to the one or more manufacturing steps, a second portion of the non-line-of-sight accessible information from the contact memory button to the tracking system, wherein the second portion of the non-line-of-sight accessible information comprises environmental history data describing environment conditions to which the plurality of separate materials and the tracking device were exposed during the one or more manufacturing steps and service data comprising a manual associated with the first material;

wherein receiving the plurality of separate materials comprising the first material comprises receiving the plurality of separate materials comprising the first material without the tracking device being physically associated with the first material, and physically associating the tracking device with the first material;

wherein the tracking device comprises a printed part label, wherein the contact memory button is physically integrated into the printed part label and physically associating the printed part label with the first material comprises gluing the tracking device to the first material; and wherein the one or more manufacturing steps comprises heating or moulding the plurality of separate materials at a sufficient temperature to form the plurality of separate materials into a single, composite structure receiving a plurality of separate materials comprising a first material, the first material being physically associated with a tracking device comprising a first storage medium featuring line-of-sight accessible information and a contact memory button featuring non-line-of-sight accessible information, the line-of-sight accessible information and the non-line-of-sight accessible information each comprising information regarding the first material physically associated with the tracking device;

communicating a first portion of the non-line-of-sight accessible information from the contact memory button to a tracking system;

subjecting the plurality of separate materials, including the first material and the tracking device, to one or more manufacturing steps, wherein the one or more manufacturing steps form the plurality of separate materials and the tracking device into a single, composite structure; and communicating, after subjecting the plurality of separate materials to the one or more manufacturing steps, a second portion of the non-line-of-sight accessible information from the contact memory button to the tracking system, wherein the second portion of the non-line-of-sight accessible information comprises environmental history data describing environment conditions to which the plurality of separate materials and the tracking device were exposed during the one or more manufacturing steps and service data comprising a manual associated with the first material;

wherein receiving the plurality of separate materials comprising the first material comprises receiving the plurality of separate materials comprising the first material without the tracking device being physically associated with the first material, and physically associating the tracking device with the first material; and wherein the tracking device comprises a printed part label, wherein the contact memory button is physically integrated into the printed part label and physically associating the printed part label with the first material comprises gluing the tracking device to the first material.

9. The method of claim 8, wherein the first storage medium comprises a barcode.

10. The method of claim 8, wherein the first storage medium and the contact memory button are physically incorporated into a single device.

11. The method of claim 8, wherein the first portion and the second portion contain the same information.

12. The method of claim 8, further comprising providing, from the tracking system, at least one status update to a user based on the first portion and the second portion.

13. The method of claim 12, wherein the status update comprises an update in a location of the tracking device based on movement of the tracking device between when the first portion was communicated and when the second portion was communicated.

14. A method of manufacturing aircraft parts, the method comprising:

receiving a plurality of separate materials comprising a first material, the first material being physically associated with a tracking device comprising a first storage medium featuring line-of-sight accessible information and a contact memory button featuring non-line-of-sight accessible information, the line-of-sight accessible information and the non-line-of-sight accessible information each comprising information regarding the first material physically associated with the tracking device;

communicating a first portion of the non-line-of-sight accessible information from the contact memory button to a tracking system;

subjecting the plurality of separate materials, including the first material and the tracking device, to one or more manufacturing steps, wherein the one or more manufacturing steps form the plurality of separate materials and the tracking device into a single, composite structure;

communicating, after subjecting the plurality of separate materials to the one or more manufacturing steps, a second portion of the non-line-of-sight accessible information from the contact memory button to the tracking system, wherein the second portion of the non-line-of-sight accessible information comprises environmental history data describing environment conditions to which the plurality of separate materials and the tracking device were exposed during the one or more manufacturing steps and service data comprising a manual associated with the first material; and providing, from the tracking system, at least one status update to a user based on the first portion and the second portion wherein receiving the plurality of separate materials comprising the first material comprises receiving the plurality of separate materials comprising the first material without the tracking device being physically associated with the first material, and physically associating the tracking device with the first material; and wherein the tracking device comprises a printed part label, wherein the contact memory button is physically integrated into the printed part label and physically associating the printed part label with the first material comprises gluing the tracking device to the first material.

15. The method of claim 14, wherein the first storage medium comprises a barcode.

16. The method of claim 14, wherein the first storage medium and the contact memory button are physically incorporated into a single device.

17. The method of claim 14, wherein the one or more manufacturing steps comprises heating or moulding the plurality of separate materials at a sufficient temperature to form the plurality of separate materials into a single, composite structure.

18. The method of claim 14, wherein the first portion and the second portion contain the same information.

19. The method of claim 14, wherein the status update comprises an update in a location of the tracking device based on movement of the tracking device between when the first portion was communicated and when the second portion was communicated.

* * * * *